(12) United States Patent
Proctor et al.

(10) Patent No.: US 6,205,125 B1
(45) Date of Patent: Mar. 20, 2001

(54) METHOD AND SYSTEM FOR DETERMINING AN ESTIMATE OF A TRANSMISSION TIME OF A PACKET

(75) Inventors: Lee Michael Proctor, Cary; Gino Anthony Scribano, Elk Grove Village, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/126,827

(22) Filed: Jul. 31, 1998

(51) Int. Cl.[7] .................................................... H04Q 7/00
(52) U.S. Cl. ........................ 370/328; 370/342; 370/519; 455/67.6; 455/436; 455/502
(58) Field of Search ..................................... 370/328, 331, 370/333, 335, 342, 350, 519, 252, 238; 375/356, 267, 299, 347; 455/442, 67.6, 502, 436

(56) References Cited

U.S. PATENT DOCUMENTS 5,586,119 * 12/1996 Scribano et al. .................... 370/350

* cited by examiner

Primary Examiner—Wellington Chin
Assistant Examiner—Maikhanh Tran
(74) Attorney, Agent, or Firm—Philip P. Macnak

(57) ABSTRACT

A method and apparatus for determining the transmission time of packets of information in a communication system includes a temporal offset processor (330) which receives transmission delay information from a delay analyzer (315) and soft handoff state information from a control processor (320). This information is used to determine a temporal offset for packets of information. The temporal offset is used by a network arbiter (350) to determine when the associated packet should be transferred in time.

28 Claims, 3 Drawing Sheets

METHOD AND SYSTEM FOR DETERMINING AN ESTIMATE OF A TRANSMISSION TIME OF A PACKET

FIELD OF THE INVENTION

The present invention relates generally to communication systems, and more particularly to a method for determining the time of transmission of packets of information in communication systems.

BACKGROUND OF THE INVENTION

Digital wireless communication systems, such as Code Division Multiple Access (CDMA) cellular systems, are increasingly utilizing packet based transmission protocols to transport information between infrastructure entities. These protocols include frame relay and Asynchronous Transport Mechanism (AIM). The information to be transported includes encoded voice packets, data and control information.

In a digital cellular communication system, a mobile unit communicates over the air interface with a Base Station (BS), which in turn is connected to a Base Station Controller (BSC). Several physical communication mediums can be used between the BS and the BSC, including T1 span lines, microwave links and satellite links. These transport mediums can support several transport mechanisms. The transport mechanisms are typically grouped into two categories, circuit based and packet based. Circuit based protocols typically partition the medium into fixed bandwidth channels in a Time Division Multiplex (TDM) configuration. Each channel is dedicated to one phone call and tends to be very synchronous in operation.

Packet based protocols typically share the medium on a as-needed basis. Greater utilization efficiency can be achieved by sharing the bandwidth, resulting in the support of more channels. In the case of speech information, conventional code division multiple access (CDMA) cellular systems take advantage of the statistical nature of speech to increase the number of channels handled by a given data network. This is particularly the case with CDMA systems where speech coding algorithms in voice coders (vocoders) generate variable speech packet sizes that are directly related to the amount of speech activity at a given time. With the increased usage of the internet, data services is also increasingly showing a highly variable data rate.

Although packet based mechanisms will typically support a greater number of channels, they suffer from a large variance in transmission delay. This is due to the asynchronous nature of the packet transmission. As packets arrive for transmission on the data network, they have to be queued until space can be found to send them. The amount of time that they have to be queued depends heavily on the number of, and size of, other packets that are currently pending. In a cellular system, components at each end of the BS to BSC packet pipe rely on a synchronous data flow. These include the air interface between the BS and the mobile units as well as the interface to and from the vocoders. To support these synchronous interfaces an asynchronous to synchronous conversion is required. Typically this is handled by allowing for the worst case packet variance and buffering data appropriately.

One of the primary benefits of current CDMA systems is the ability to perform soft handoffs. With soft handoff each mobile unit can be in simultaneous communication with multiple BSs. For example if a mobile unit is in a 2-way soft handoff call, framed information will be sent to two BSs, the BSs will process the information, packetize it (in the case of a packet based network) and send it to the BSC. A selector function will analyse the packets received from the two BSs and select the best one for forwarding to, in the case of encoded speech, the vocoder. In the other direction, a speech encoded packet from the vocoder will be duplicated and sent to the two BSs for transmission to the mobile. However, the transmission paths to the BSs from the BSC can exhibit very different delay characteristics. As used herein, a forward link packet is one generated at a base site controller and transmitted via one or more base sites for reception by a mobile unit. A reverse link packet is one generated and transmitted by a mobile unit for reception at a base site controller via one or more base sites.

Digital cellular systems, including CDMA systems, are subject to relatively long delays. Typically delays from the mobile unit, through the BS, the BSC, the Mobile Switching Center (MSC), the Public Switched Telephone Network (PSTN) and back to the mobile unit can exceed 200 milliseconds (ms). Increased use of packet based networks, the mixing of circuit and packet based networks, and the networking of equipment from different manufacturers will cause delays to increase further. Increased speech delays can negatively impact a user's perception of voice quality when in a conversation. As the roundtrip delay in a cellular system increases beyond 200 ms an increased percentage of users will consider the delay bothersome.

Consequently a need exists for an apparatus and method which facilitates a reduction in system delay while maintaining a high channel throughput.

DETAILED DESCRIPTION OF A PREFERRED EMBODIMENT

Figure 1:
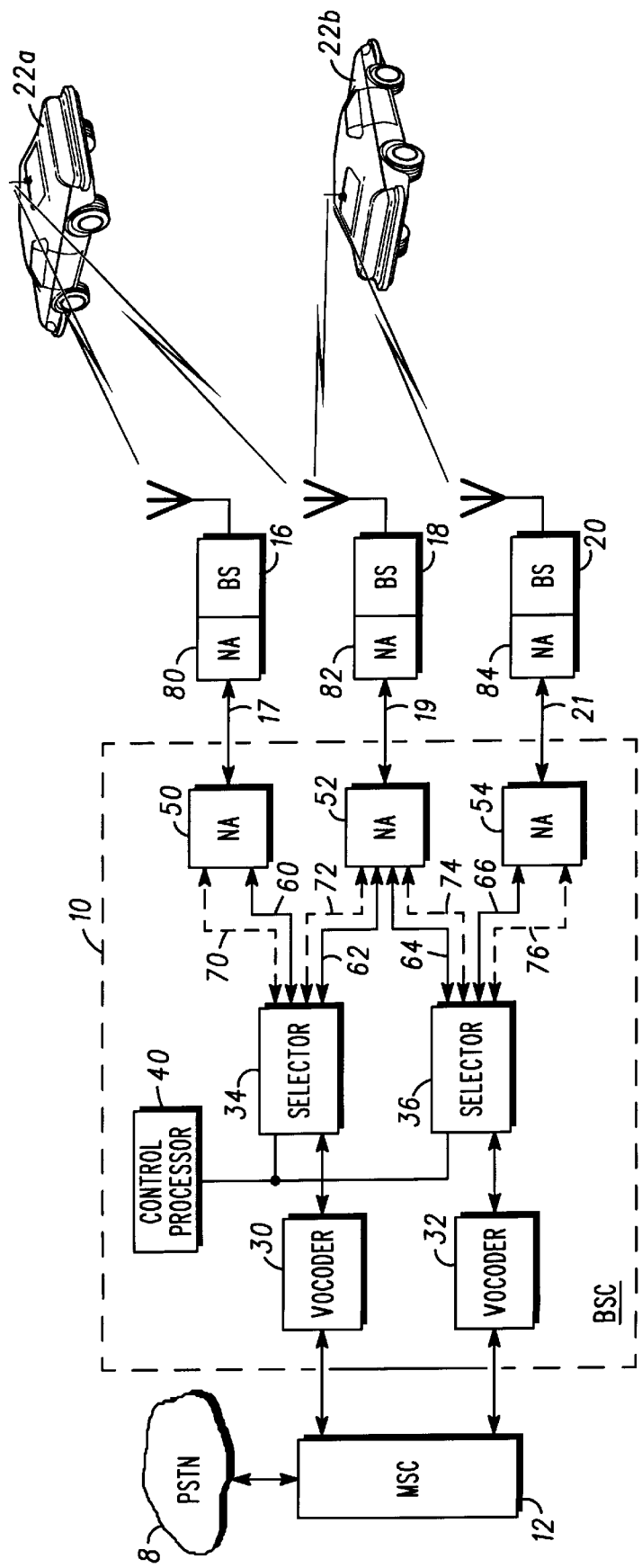
FIG. 1 generally depicts a communication system in accordance with the preferred embodiment of the present invention.

A method and apparatus for determining an estimate of the time of transmission of packets of information in a communication system includes a temporal offset processor which receives transmission delay information from a delay analyzer and quality of service and call state information from a control processor. This information is used to determine a temporal offset for packets of information. The temporal offset is used by a network arbiter to determine when the associated packet should be transferred relative to other packets of information.

Stated generally, a method for determining the time of transmission of packets of information in a communication system, comprises the steps of receiving a first packet of information associated with a communication between a first mobile unit and at least a first base site transmitter and a second base site transmitter and comparing a transmission delay associated with the first base site transmitter and a transmission delay associated with the second base site transmitter. The method further includes the steps of receiving additional packets of information at the network arbiter and determining an estimate of the time of transmission of the first and additional packets based, at least in part, on the comparison.

In one embodiment, the step of comparing further comprises the step of determining the difference in transmission delay associated with the first base site transmitter and the transmission delay associated with the second base site transmitter. The transmission delay associated with the first base site transmitter is the transmission delay between a first selector and the first base site transmitter. The transmission delay associated with the second base site transmitter is the transmission delay between the first selector and the second base site transmitter. In this embodiment, the selector resides in a base site controller.

The additional packets of information are associated with independant communications between additional mobile units and at least the first base station. The step of determining the estimate of the time of transmission further comprises the steps of determining a plurality of differences between a transmission delay associated with the first base site transmitter and the transmission delays associated with a plurality of further base site transmitters and determining the estimate of the time of transmission of the first and additional packets based, at least in part, on the plurality of differences.

Additionally, the method further includes the steps of generating the first packet of information at a base station controller, inserting into the packet a data field containing a packet temporal offset, where the packet temporal offset is based, at least in part, on the difference in transmission delay associated with the first base site transmitter and the transmission delay associated with the second base site transmitter and transmitting the first packet of information from the base station controller to a network arbiter. The network arbiter determines the transmission packet temporal offset for the first packet by extracting the inserted data field and also determines a packet delay offset, the packet delay offset being based, at least in part, on the packet temporal offset. The time of transmission of the first packet of information is further based on the packet delay offset.

In this embodiment, the step of determining the type of information contained in the first packet of information, wherein the packet temporal offset is further based on the type of information contained in the first packet of information. The network arbiter determines a network delay offset which is based, at least in part, on a user configurable parameter. The method further includes the steps of determining a plurality of differences between a transmission delay associated with the first base site transmitter and the transmission delays associated with a plurality of further base site transmitters and determining a network delay offset, where the network delay offset is based, at least in part, on the plurality of differences. Further stesp include determining a first location in a first data buffer, the location being based, at least in part, on the packet delay offset and determining whether the first location in the first data buffer can accommodate the first packet of information. The first location accommodates the first packet of information and the first packet of information is placed in the first location of the first data buffer.

When the first location cannot accommodate the first information packet, the method includes the steps of determining a second location in the first data buffer, the location being based, at least in part, on the first location and determining whether the second location in the first data buffer can accommodate the first packet of information. When the second location cannot accommodate the first packet of information, the method further includes the steps of determining a transmission time associated with the second location in the first data buffer, determining a packet discard time, the packet discard time being based, at least in part, on the packet delay offset and determining whether the packet discard time is less than the transmission time. The method further includes the step of discarding the first packet of information when the packet discard time is less than the transmission time or placing the first packet of information in the second location of the first data buffer when the packet discard time is not less than the transmission time.

The general method further includes the steps of receiving a second packet of information, associated with a communication between a second mobile unit and at least the first base site transmitter and the second base site transmitter, determining the type of information contained in the first packet of information, determining the type of information contained in the second packet of information and determining the time of transmission of the first, second and additional packets based, at least in part, on the type of information contained in the first packet of information. The step of determining the time of transmission is further based on the type of information contained in the second packet of information and the first packet of information is determined to contain encoded speech and the second packet of information is determined to contain user data, the method further comprising transmitting the first packet of information before transmitting the second packet of information.

FIG. 1 generally depicts a communication system in accordance with the preferred embodiment of the present invention. As shown in FIG. 1, a BSC 10 is in communication with an MSC 12, which is in turn in communication with a PSTN 8. In the preferred embodiment, the communication system is a Code Division Multiple Access (CDMA) cellular radiotelephone system, however it will be recognized by those of ordinary skill in the art that any suitable communication system may utilize the invention. BSs 16, 18 and 20 communicate to BSC 10 through limited bandwidth links 17, 19 and 21. BSs 16, 18 and 20 also communicate with a plurality of mobile units 22a and 22b via the CDMA air interface.

BSC 10 includes a plurality of vocoders 30 and 32 in communication with MSC 12 and selectors 34 and 36. Vocoder 30 receives a digital speech signal from MSC 12 and compresses the digital speech signal into speech packets using a speech compression algorithm. In the preferred embodiment CDMA communication system, the compression algorithm is the Enhanced Variable Rate Codec algorithm (EVRC), however other speech compression algorithms are well known in the art. Selector 34 determines a call state of a communication associated with a particular packet. This call state includes the number of BSs in which mobile unit 22a is in simultaneous communication. In the case of FIG. 1, mobile unit 22a is in simultaneous communication with BSs 16 and 18. The call state also includes the type of communication, for example speech, data or control. In the preferred embodiment, selector 34 receives the number of BSs and the communication type from the control processor 40. The call state also includes information on the difference in transmission delays between links 17 and 19.

Selector 34 receives speech packets from vocoder 30 and broadcasts them to an appropriate number of network arbiters (NAs) 50, 52 or 54 depending on the soft handoff state.

As shown in FIG. 1, the communication to mobile unit 22a has two soft handoff legs, thus each speech packet associated with mobile unit 22a is sent to two NAs 50 and 52 via communication links 60 and 62. Selector 34 utilises the call state associated with each communication, at least in part, to determine a temporal offset of each packet. Information on the temporal offset is communicated to the NAs 50 and 52 via control links 70 and 72. In the preferred embodiment, the temporal offset is embedded into the speech packets by selector 34 and control links 70 and 72 are therefore embedded information streams within communication links 60 and 62.

In the preferred embodiment, the temporal offset determination is performed in selectors 34 and 36. However, it will be recognized by those of ordinary skill in the art, that alternative embodiments exist. For example, selector 34 could embed the call state information into the information packets and the NAs 50 and 52 would then use the call state to determine the temporal offset.

Similarly, selector 36 receives speech packets from vocoder 32 and call state information from control processor 40. Speech packets are forwarded to NAs 52 and 54 via communication links 64 and 66. Selector 36 determines a temporal offset for each packet based, at least in part, on the call state information. The temporal offset is forwarded to NAs 52 and 54 via control links 74 and 76.

In the preferred embodiment, NAs 50, 52 and 54 receive speech packets from a plurality of selectors, corresponding to a plurality of mobile units. NAs 50, 52 and 54 utilize the temporal offset associated with each packet to determine the estimate (or the target) of the time of transmission of the packets into network communication links 17, 19 and 21. For example, speech or data packets destined for mobile unit 22b must be simultaneously transmitted over the air interface by BSs 18 and 20. However, communication link 21 is longer than communication link 19 and hence the packet network transmission time from NA 54 to NA 84 is greater than that from NA 52 to NA 82. Hence, a speech or data packet destined for mobile unit 22b can be buffered longer at arbiter 52 while still ensuring simultaneous transmission via the air interface. Similarly, speech or data packets destined for mobile unit 22a must be simultaneously transmitted over the air interface by BSs 16 and 18. The packet network transmission time from NA 52 to NA 82 is greater than that from NA 50 to NA 80. Hence, speech or data packets destined for mobile unit 22a can be buffered longer at arbiter 50 than arbiter 52.

In the preferred embodiment, a scheduling scheme, based at least in part on the call state information, is utilized by the selectors to determine the temporal offset in accordance with the invention. Network arbiters resolve the temporal offset information from the selectors to some arbitrary unit of time, called a delay offset. This delay offset is utilized to determine a target transmission time.

Quality of service information is translated into a communication type offset according to service specific requirements. The communication type offset provides a mechanism to allow later-arriving delay-sensitive packets to be transmitted before sooner arriving delay-insensitive packets.

In the preferred embodiment, the temporal offset is the sum of the transmission delay offset and the communication type offset. For simulcast communication systems with up to three soft handoff legs per communication, the temporal offset is determined according to the following call state information:

| Call State | Temporal Offset | |
|---|---|---|
| | Transmission Delay Offset | Communication Type Offset |
| 3-way call, longest leg | 0 | $S_Y$ |
| 2-way call, longest leg | 0 | $S_Y$ |
| 1-way call | 0 | $S_Y$ |
| 2 or 3-way call, equal legs | 0 | $S_Y$ |
| 3-way call, middle leg | $\delta_{LONGEST}-\delta_{MIDDLE}$ | $S_Y$ |
| 2-way call, shortest leg | $\delta_{LONGEST}-\delta_{SHORTEST}$ | $S_Y$ |
| 3-way call, shortest leg | $\delta_{LONGEST}-\delta_{SHORTEST}$ | $S_Y$ | where:
  $\delta_{LONGEST}$ is the largest transmission delay measurement of all BSs participating in this call;
  $\delta_{MIDDLE}$ is neither the largest nor smallest transmission delay measurement of all BSs participating in this call;
  $\delta_{SHORTEST}$ is the smallest transmission delay measurement of all BSs participating in this call;
  $S_T$ is a service or communication type specific parameter which allows packets of other service types to be transmitted sooner than packets of this service type.

For illustrative purposes, communication type delay offset parameters for delay-sensitive services, such as speech, will be assigned a value of zero. Communication type delay offset parameters for delay-insensitive services, like data, will be assigned a value of 10 ms.

Figure 2:
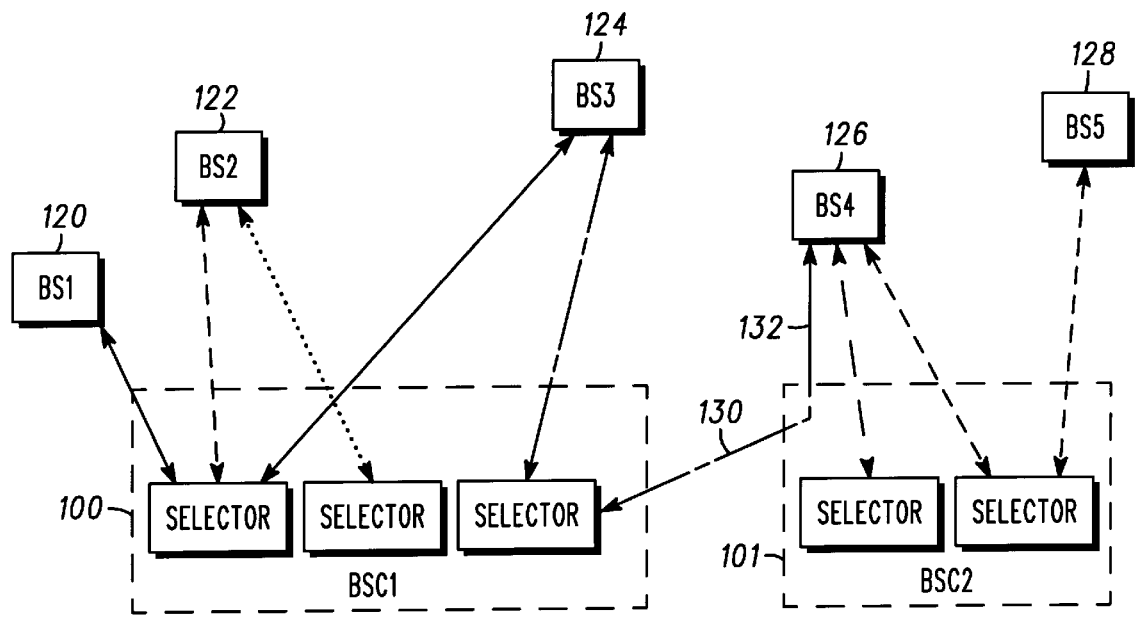
FIG. 2 depicts a communication system in accordance with the packet scheduling scheme of the preferred embodiment of the present invention.

FIG. 2 illustrates the application of the scheduling scheme for five calls, each one having a different communication scenario. Relative transmission delays are indicated by the relative length of the communication links 220, 222, 224 in FIG. 2. BSC 100 is in direct communication with BSs 120, 122 and 124 while BSC 101 is in direct communication with BSs 126 and 128. In addition, BSC 100 is in indirect communication with BS 126 via BSC 101.

Speech communication 1 is in three-way soft handoff. Following the scheduling scheme of the preferred embodiment, the packets to be transmitted via the longest leg, to BS 124, are assigned a 0 ms temporal offset. while the packets to be transmitted via the middle leg, to BS 122, are assigned a $\delta_{LONGEST}-\delta_{MIDDLE}$ ms temporal offset. The packets to be transmitted via the shortest leg, to BS 120, are assigned a $\delta_{LONGEST}-\delta_{SHORTEST}$ ms temporal offset.

Speech communicaton 2 is a one-way call, not in soft handoff. Following the priority scheme of the preferred embodiment, packets associated with communication 2 are assigned a 0 ms temporal offset for transmission to BS 122.

Speech communication 3 is in two-way soft handoff, with the longest leg being via BSC 101 to BS 126. Following the scheduling scheme of the preferred embodiment, the packets to be transmitted on the longest leg are assigned a 0 ms temporal offset. The packets to be transmitted via the shortest leg, to BS 124, are assigned a $\delta_{LONGEST}-\delta_{SHORTEST}$ ms temporal offset.

Speech communication 4 is a one-way communication, not in soft handoff. Following the scheduling scheme of the preferred embodiment, packets associated with communication 4 are assigned a 0 ms temporal offset for transmission to BS 126.

Data communication 5 is in two-way soft handoff. Following the scheduling scheme of the preferred embodiment, packets associated with the longest leg, to BS 128, are assigned a 10 ms temporal offset while packets to be transmitted via the shortest leg, to BS 126, are assigned a $\delta_{LONGEST}-\delta_{SHORTEST}+10$ ms temporal offset.

Figure 3:
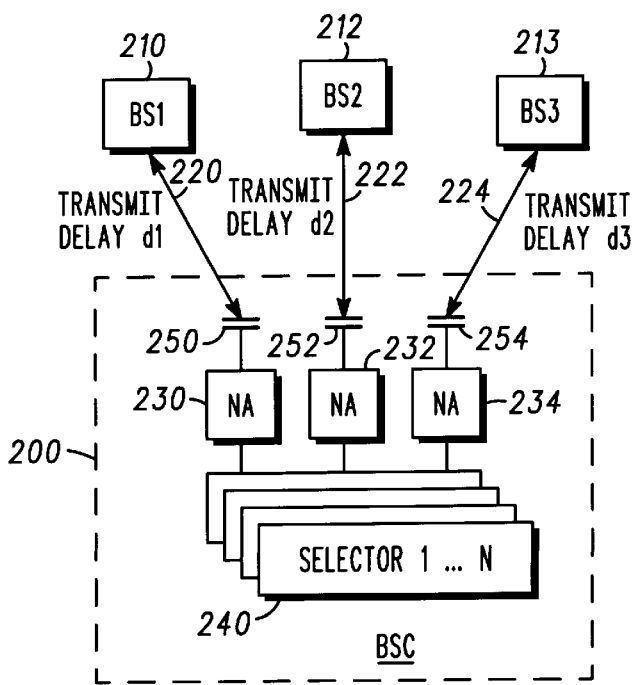
FIG. 3 is a diagram generally representing transmission and buffering delays in accordance with the preferred embodiment of the invention.

FIG. 3 shows a BSC 200 in communication with three BSs 210, 212 and 214 via communication links 220, 222 and 224. Associated with communication links 220, 222 and 224 are transmission delays $\delta_1$, $\delta_2$ and $\delta_3$. Within the BSC 200 are NAs 230, 232 and 234, receiving information packets and associated temporal offset information from a plurality of selectors 240. Buffers 250, 252 and 254 are associated with each NA. Nas utilize temporal offset information to schedule packet transmission into communication links 220, 222 and 224 via buffers 250, 252 and 254.

Without the scheduling scheme of the preferred embodiment, the maximum buffering delay associated with packets for a communication is primarily dependant on the number of calls being carried on the communication links. With the scheduling scheme in accordance with the invention, the maximum buffering delay, while still being dependant on the call loading, will also be determined by the relative transmission delays of the soft handoff legs and the communication type.

Figure 4:
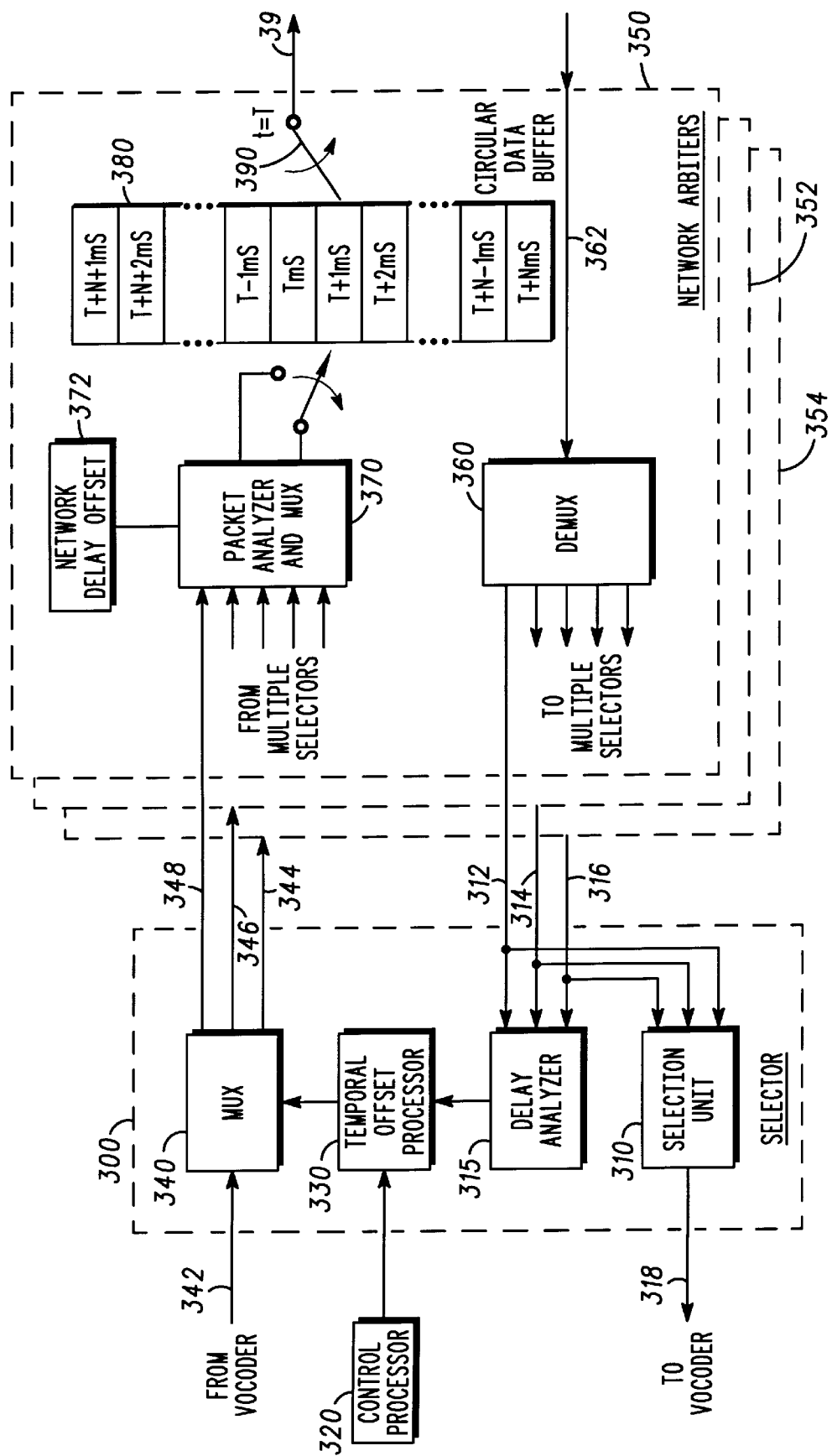
FIG. 4 depicts a block diagram of a system for determining the time of transmission of packets of information in accordance with the preferred embodiment of the invention.

FIG. 4 depicts a block diagram of a selector and NA configuration in accordance with the invention. As shown in FIG. 4, selector 300 is connected to three NAs 350, 352 and 354 and each NA is connected via a packet pipe to a BS (not shown). This configuration implies that the associated communication is in three-way soft handoff. As the associated mobile unit moves within the system, the number of soft handoff legs and the NAs used will vary. Also the type of communication could change. For example, a call could start off as a voice call and then transition to a data call. NA 350 includes a demultiplexer 360 which is responsible for analysing all packets received on communication link 362. Demultiplexer 360 determines the destination selector for each packet. All packets associated with the communication of interest are passed to selector 300 via communication link 312.

Selector 300 also receives packets associated with other soft handoff legs of the communication from NA 352 via communication link 314 and from NA 354 via communication link 316. A selection unit 310 analyzes the three packets, in the case of three-way soft handoff, associated with each speech frame and, using embedded packet quality information, selects the best frame. This selection process is well known in the art. The selected packet is passed to the vocoder (not shown) via communication link 318.

The three packets are also routed to a delay analyzer 315 which determines the relative differential delays between the legs of the communication. The determination is performed based upon delay information embedded in each packet and on the arrival time of each packet at delay analyzer 315. The embedded delay information provides data on the arrival time of associated forward link packets received at the BSs from the BSC. In the preferred embodiment, the embedded delay information conforms to the Packet Arrival Timing Error (PATE) information field as specified in the traffic frame format of the Telecommunications Industry Association standard 634A (TIA/IS-634-A). Using this delay information, delay analyzer 315 determines which legs of the call exhibit the longest, second longest and shortest delays and the relative delay difference between the legs. This information is passed to the temporal offset processor 330.

Temporal offset processor 330 also receives soft handoff state information from the control processor 320 which indicates the number of soft handoff legs associated with the communication and hence the number of destination BSs which associated packets are to be sent to. Temporal offset processor 330 also receives communication type information from the control processor 320. Temporal offset processor 330 uses the delay information, the number of soft handoff legs and the communication type to assign a temporal offset to each of the legs of the communication as described above in accordance with the invention. The temporal offsets are then passed to the multiplexer (MUX) 340.

For a speech communication type, MUX 340 receives a speech frame from a vocoder (not shown) via communication link 342. In the preferred embodiment of the CDMA communication system, each speech frame represents 20 ms of speech. For a data communication type, MUX 340 receives a data frame from a data source. The data source (not shown) could be a digital modem, InterWorking Unit or as in the preferred embodiment, a vocoder operating in a data mode. MUX 340 replicates the speech or data frame, the number of duplicates being dependant on the number of soft handoff legs associated with the communication. Each of the speech or data frames is appended with additional information to form an information packet. In the preferred embodiment, the information packet conforms to the traffic frame format specified in TIA/IS-634-A as mentioned above. The temporal offset associated with the packet's destination leg is then appended to each information packet by MUX 340.

The information packets with the tagged temporal offsets are then sent to the NAs associated with the destination BSs. In the three-way soft handoff example of FIG. 4, one packet is sent to NA 354 via communication link 344, one packet is sent to NA 352 via communication link 346 and the third packet is sent to NA 350 via communication link 348.

NA 350 receives information packets tagged with their appropriate temporal offset from multiple selectors including a packet from selector 300. Each speech or data packet is associated with a call. A packet analyzer and MUX 370 then extracts the temporal offsets from the information packets.

The circular data buffer 380 is partitioned into several data sections, each data section being representative of a unit of time. The pre-determined size of the data section is dependant on the quantity of data that can be transmitted via communication link 395 in the unit of time. In the preferred embodiment the unit of time is 1 ms. As the resolution of the temporal offsets may not be at the same resolution as the unit of time, a simple conversion may be required. In one embodiment the temporal offset will be rounded up to the next integer units of time. For example, for a 1 ms unit of time a temporal offset of 4.2 ms would be rounded up to 5 ms. However, in the preferred embodiment the temporal offset would be at the same resolution as the unit of time, and hence no conversion would be necessary. If a conversion is necessary then it is performed by the MUX 370.

The MUX 370 then calculates a packet delay offset for each of the packets of information. The delay offset for a packet is, at least, a function of the temporal offset associated with the packet, the temporal offset being rounded up if necessary. The delay offset is also a function of a network delay offset 372. The network delay offset 372 is to allow for quality of service considerations where a system operator can tradeoff system delays versus discarding packets. In the preferred embodiment the network delay offset 372 is configurable by the operator and fixed until the operator desires to change it. Alternative embodiments include the MUX 370 varying the network delay offset 372 based upon the loading of the network or based upon the average of the delays associated with the base sites. In the preferred embodiment the packet delay offset is realised by adding the packet temporal offset to the network delay offset.

The packet delay offset, $\delta_{pdo}$ is then used to determine a section of the circular data buffer 380 to place the packet of information. Circular data buffer has N sections each section being capable of storing 1 ms of transmittable information. FIG. 4 illustrates the situation at an arbitrary time t=T. MUX 390 is reading a packet from a section T of the circular data buffer 380. The first section of the buffer 380 where the MUX 370 attempts to place the packet is the section representing T+$\delta_{pdo}$mS. If the section is full and therefore cannot accommodate the packet, the MUX 370 attempts to place it in the next section, ie T+$\delta_{pdo}$+1 mS. If that section is also full then it proceeds to the first section that can accommodate the packet. If too many sections cannot accommodate the packet, then it follows that the packet may be dispatched to the BS too late to be transmitted to the mobile. Hence it is desirable to have a packet discard mechanism so that the packet is discarded before it utilizes valuable bandwidth on communication link 395. In the preferred embodiment, a discard threshold, $\delta_{discard}$ is used. If the first section that can accommodate the packet is beyond T+$\delta_{pdo}$+$\delta_{discard}$ ms then the packet is discarded before being placed in the buffer 380. Alternative embodiments exist, including tagging each packet with a discard time, placing the tagged packet into the buffer, and then discarding the packet if it cannot be transmitted to the BS (not shown) before the discard time.

The MUX 390 retrieves the packets serially from the buffer 380 and sends them to the associated BS via communication link 395. In the example of FIG. 4, MUX 390 will read all the packets in section T, before proceeding to read the packets from section T+1 ms. If any sections do not contain any packets, then the MUX just proceeds to the next section.

Although in this embodiment the temporal offset tag is extracted, in an alternative embodiment the tag remains appended to each packet to assist in determining the target time transmission through other entities and communication links of the system. For example each BS could use the temporal offset received in each forward link packet to determine a temporal offset for reverse link packets associated with the same communication.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

We claim:

1. A method for determining a time of transmission of packets of information in a communication system, comprising the steps of:

receiving a first packet of information associated with a communication between a first mobile unit and a first base site transmitter and a second base site transmitter;

comparing a transmission delay associated with the first base site transmitter and a transmission delay associated with the second base site transmitter;

receiving additional packets of information at a network arbiter; and determining an estimate of the time of transmission of the first packet and the additional packets based, at least in part, on the comparison, wherein the additional packets of information are associated with independent communications between additional mobile units and at least the first base site transmitter, and wherein the step of determining the estimate of the time of transmission comprises the steps of determining a plurality of differences between a transmission delay associated with the first base site transmitter and the transmission delays associated with a plurality of further base site transmitters, and determining the estimate of the time of transmission of the first packet and the additional packets based, at least in part, on the plurality of differences.

2. The method of claim 1, wherein the step of comparing further comprises the step of determining a difference in transmission delay associated with the first base site transmitter and the transmission delay associated with the second base site transmitter.

3. The method of claim 2, wherein the transmission delay associated with the first base site transmitter is the transmission delay between a first selector and the first base site transmitter.

4. The method of claim 3, wherein the transmission delay associated with the second base site transmitter is the transmission delay between the first selector and the second base site transmitter.

5. The method of claim 3, wherein the first selector resides in a base site controller.

6. The method of claim 1 further comprising the steps:

generating the first packet of information at a base station controller;

inserting into the first packet a data field containing a packet temporal offset, where the packet temporal offset is based, at least in part, on a difference in transmission delay associated with the first base site transmitter and the transmission delay associated with the second base site transmitter; and transmitting the first packet of information from the base station controller to a network arbiter.

7. The method of claim 6, wherein the network arbiter determines the packet temporal offset for the first packet by extracting the inserted data field.

8. The method of claim 7, wherein the network arbiter determines a packet delay offset, the packet delay offset being based, at least in part, on the packet temporal offset.

9. The method of claim 8, wherein the time of transmission of the first packet of information is further based on the packet delay offset.

10. The method of claim 6 further comprising the step of determining a type of information contained in the first packet of information.

11. The method of claim 10 wherein the packet temporal offset is further based on the type of information contained in the first packet of information.

12. The method of claim 6, wherein the network arbiter determines a network delay offset which is based, at least in part, on a user configurable parameter.

13. The method of claim 6, further comprising the steps:

determining a plurality of differences between a transmission delay associated with the first base site transmitter and the transmission delays associated with a plurality of further base site transmitters; and determining a network delay offset, where the network delay offset is based, at least in part, on the plurality of differences.

14. The method of claim 7, further comprising the steps:

determining a first location in a first data buffer, the first location being based, at least in part, on a packet delay offset; and determining whether the first location in a first data buffer can accommodate the first packet of information.

15. The method of claim 14, wherein the first location accommodates the first packet of information and the first packet of information is placed in the first location of the first data buffer.

16. The method of claim 14, wherein the first location cannot accommodate the first information packet, the method further comprising the steps:

determining a second location in the first data buffer, the location being based, at least in part, on the first location; and determining whether the second location in the first data buffer can accommodate the first packet of information.

17. The method of claim 16, wherein the second location cannot accommodate the first packet of information, the method further comprising the steps of:

determining a transmission time associated with the second location in the first data buffer;

determining a packet discard time, the packet discard time being based, at least in part, on the packet delay offset; and determining whether the packet discard time is less than the transmission time.

18. The method of claim 17, further comprising the step of discarding the first packet of information when the packet discard time is less than the transmission time.

19. The method of claim 17, further comprising the step of placing the first packet of information in the second location of the first data buffer when the packet discard time is not less than the transmission time.

20. The method of claim 1, further comprising the steps:

receiving a second packet of information, associated with a communication between a second mobile unit and at least the first base site transmitter and the second base site transmitter;

determining a type of information contained in the first packet of information;

determining the type of information contained in the second packet of information; and determining the time of transmission of the first packet, second packet and additional packets based, at least in part, on the type of information contained in the first packet of information.

21. The method of claim 20, wherein the step of determining the time of transmission is further based on the type of information contained in the second packet of information.

22. The method of claim 21, wherein the first packet of information is determined to contain encoded speech and the second packet of information is determined to contain user data, the method further comprising transmitting the first packet of information before transmitting the second packet of information.

23. A system for determining a time of transmission of packets of information in a communication system comprising:

means for receiving a plurality of packets of information;

means for comparing a transmission delay associated with a first base site transmitter and a transmission delay associated with a second base transmitter; and means for determining an estimate of the time of transmission of the plurality of packets based, at least in part on the comparison.

24. The system of claim 23, further comprising;

means for determining the difference between the transmission delay associated with the first base site transmitter and the transmission delay associated with the second base site transmitter; and means for determining the time of transmission of the plurality of packets further based on the difference.

25. A system for determining a time of transmission of packets of information in a communication system comprising:

means for receiving a plurality of packets of information;

means for determining a type of information contained in the plurality of packets of information;

means for comparing a transmission delay associated with a first base site transmitter and a transmission delay associated with a second base transmitter; and means for determining an estimate of a time of transmission of the plurality of packets based on the comparison and the type of information.

26. The system of claim 25, wherein the network arbiter further comprises:

means for determining whether the first buffer location contains an untransmitted packet of information; and means for determining a second buffer location if the first buffer location contains an untransmitted packet of information.

27. The system of claim 26, wherein the network arbiter further comprises means for inserting the packet of information into the first buffer location if the first buffer location does not contain an untransmitted packet of information.

28. The system of claim 26, wherein the network arbiter further comprises:

means for determining a transmission time associated with the second location;

means for determining a packet discard time, the packet discard time being based, at least in part, on the packet temporal offset;

means for comparing the packet discard time and the transmission time; and means responsive to the comparison for discarding the packet of information.

* * * * *